W. A. SMITH.
MACHINE FOR LACING SHOE UPPERS.
APPLICATION FILED FEB. 17, 1910.
1,075,508. Patented Oct. 14, 1913.
6 SHEETS—SHEET 4.
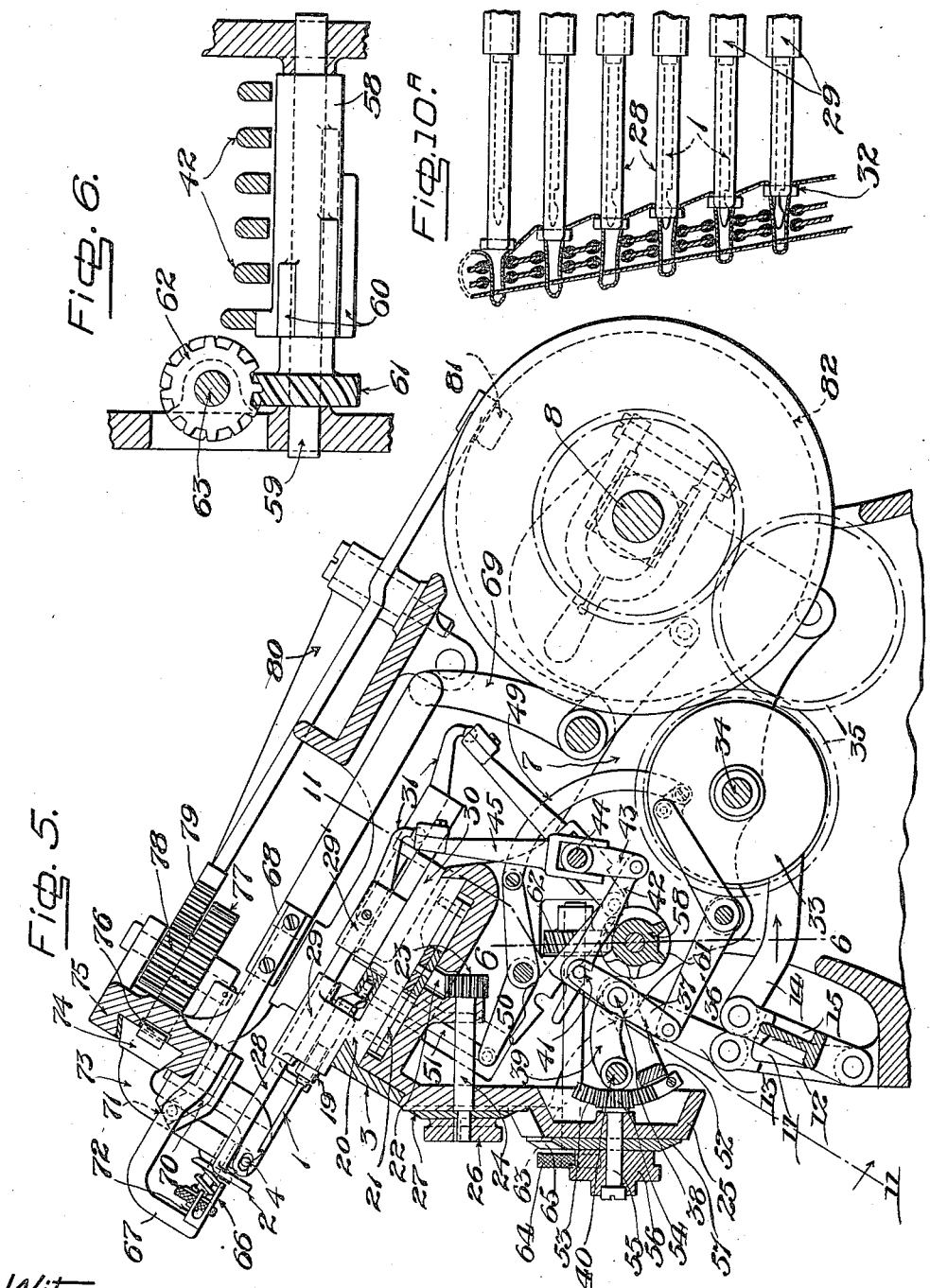
Witnesses:
M. G. Crozier
K. D. McPhail
Inventor,
Willard A. Smith
by Phillips Van Everen & Fish
attys

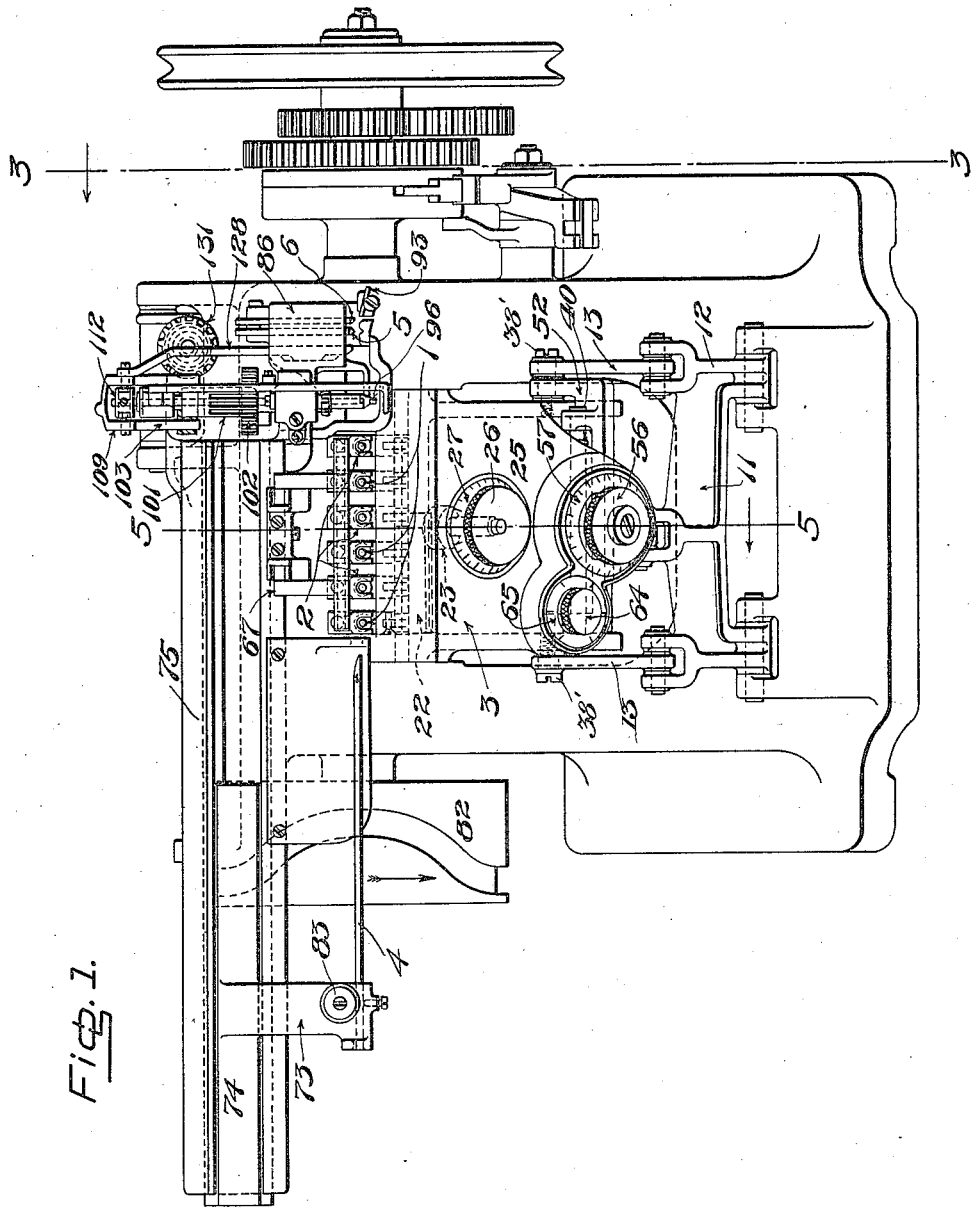

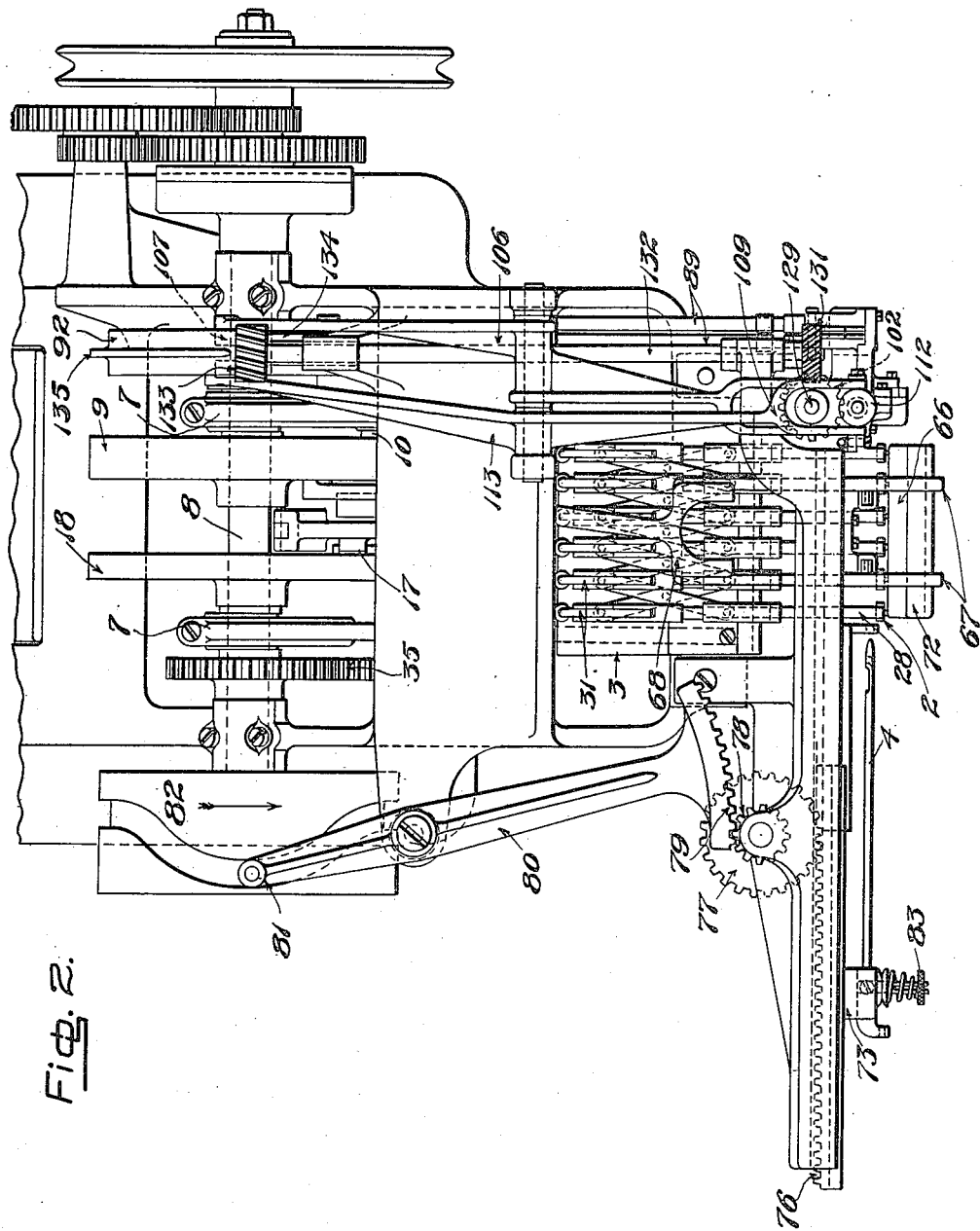

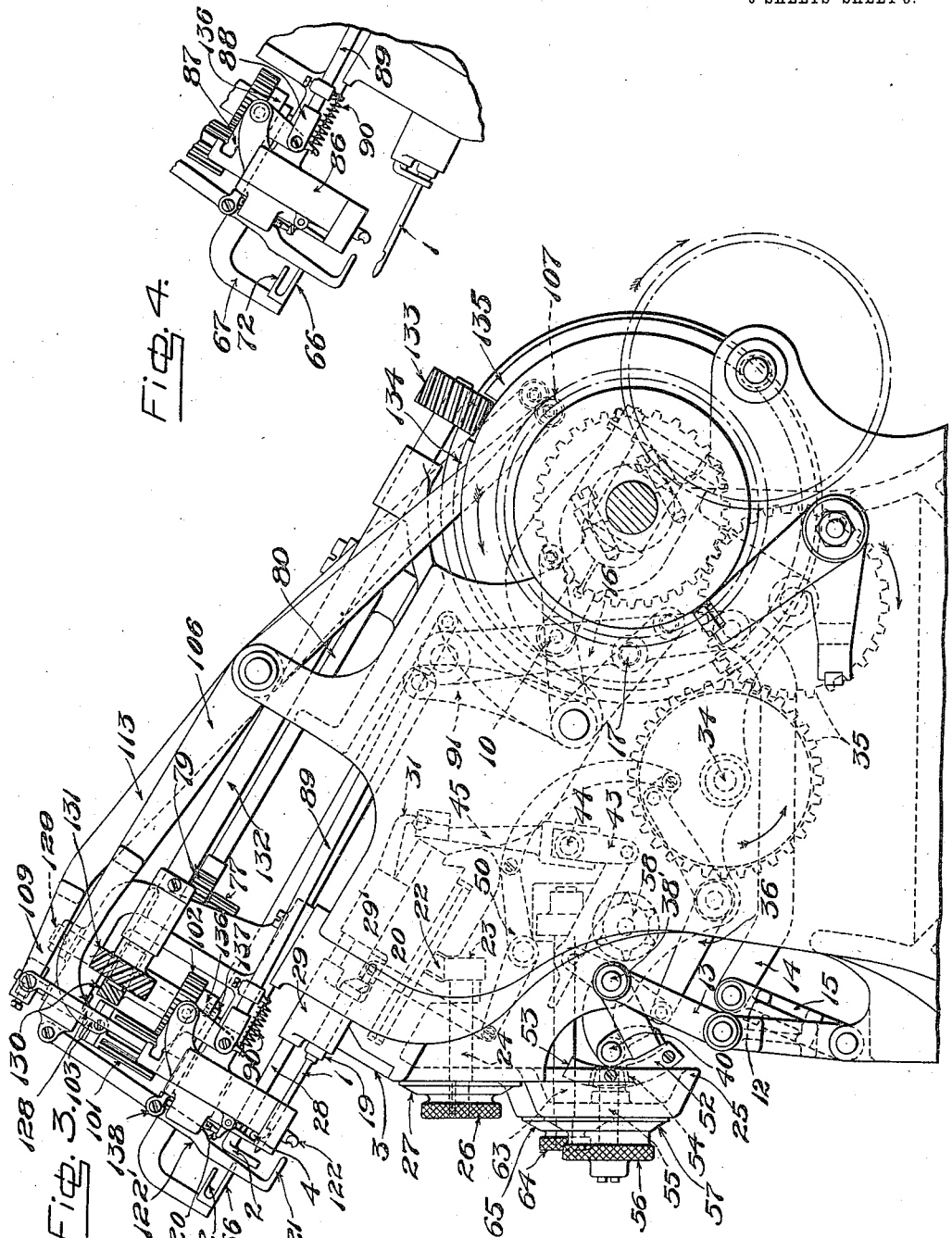

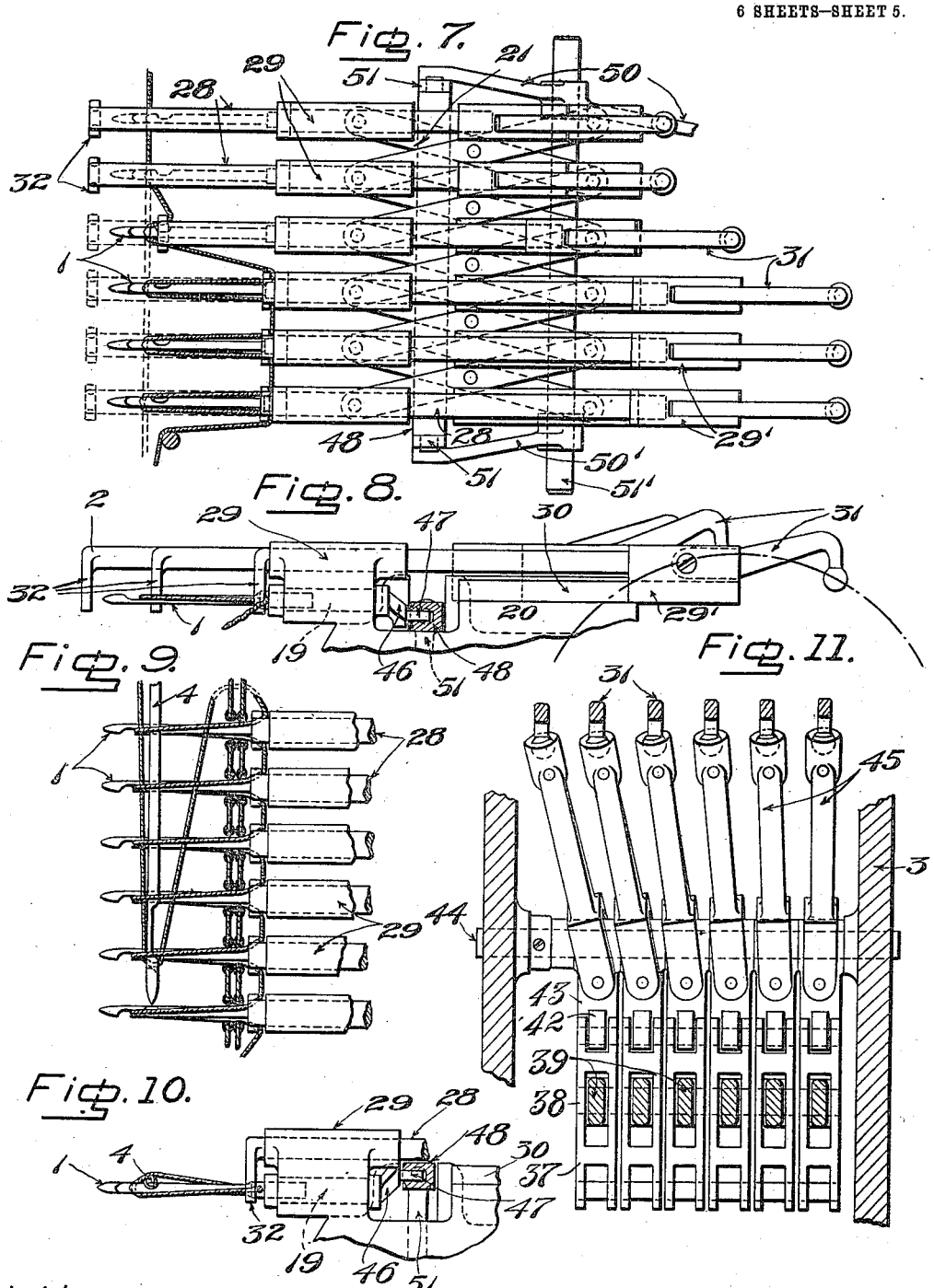

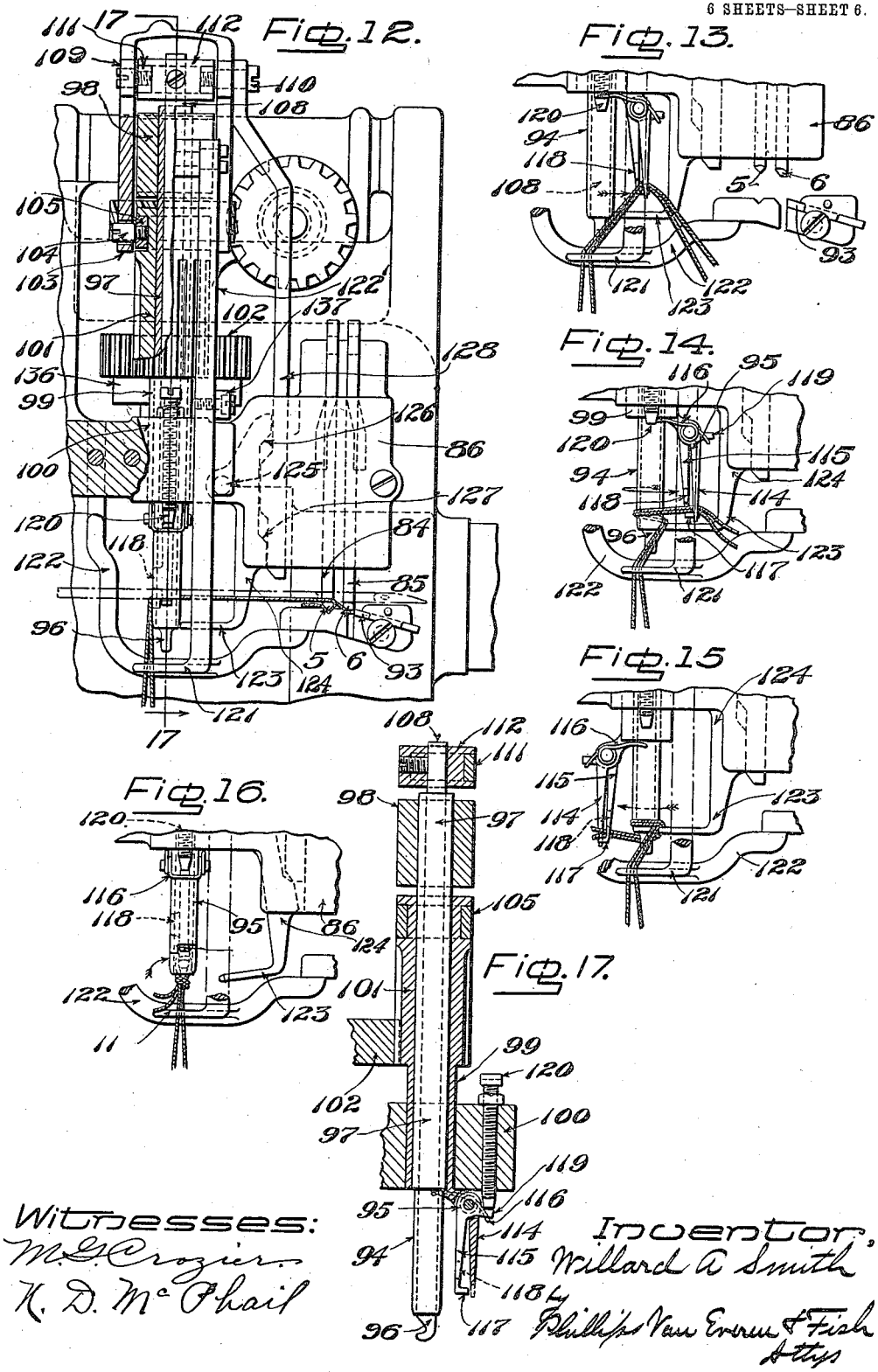

UNITED STATES PATENT OFFICE.

WILLARD A. SMITH, OF MELROSE, MASSACHUSETTS, ASSIGNOR TO UNITED SHOE MACHINERY COMPANY, OF PATERSON, NEW JERSEY, A CORPORATION OF NEW JERSEY.

MACHINE FOR LACING SHOE-UPPERS.

1,075,508. Specification of Letters Patent. Patented Oct. 14, 1913.

Application filed February 17, 1910. Serial No. 544,337.

*To all whom it may concern:*

Be it known that I, WILLARD A. SMITH, a citizen of the United States, residing at Melrose, in the county of Middlesex, and State of Massachusetts, have invented certain new and useful Improvements in Machines for Lacing Shoe-Uppers; and I do hereby declare the following to be a full, clear, and exact description of the invention, such as will enable others skilled in the art to which it appertains to make and use the same.

The invention relates to machines for lacing together the eyeleted quarters of shoe uppers preparatory to placing them on the last for the lasting and other subsequent operations.

The invention is intended primarily as an improvement in that type of lacing machines shown and described in Patent No. 962,105, dated June 21, 1910. The various features of the invention, however, are not limited in their application to this type of machine, but may be embodied in other types of machines, and the specific construction and arrangement of the various parts may be varied and modified as found desirable or best suited to the construction of machine in which the invention is embodied. The machine shown and described in said patent is provided with a plurality of looper needles equal in number to the pairs of eyelets which it is desired to lace, and with a plurality of looper fingers coöperating with the needles to form a series of loops in the lacing cord and retain the loops in position until the shoe upper is placed on the needles. A shuttle or cord feeding needle acts to place the lacing cord in position to be engaged by the looper needles and looper fingers, and to thereafter pass a portion of the cord through the loops after the loops have been inserted in the eyelet holes of the upper. In this machine the looper fingers are operated to simultaneously form the loops while the free end of the lacing cord is held by a cord gripper. In order to enable the loops to be thus formed simultaneously without breaking the lacing cord, it was necessary to provide a thread arm or takeup between the looper needles and the cord gripper to draw off slack thread previous to the formation of the loops, and to give up this slack thread during the formation of the loops. Even with this slack thread device a severe strain was put upon the cord, especially in forming four or more loops, since the cord for two or more loops are drawn either from the cord supply or from the slack thread at the opposite side of the looper needles. This strain was not only liable to cause breaking of the cord, but also was liable to cause a variation in the length of cord entering into the lacing, due to unequal stretching of the cord in lacing different shoes. It has been found necessary, therefore, to use a high grade and comparatively expensive cord in lacing shoe uppers with machines of the above type as heretofore constructed.

It is one object of the present invention to provide an improved mechanism for forming a series of loops in the lacing cord and inserting them in the eyelet holes of an upper which will enable the use of a poorer and less expensive grade of lacing cord, and will also relieve the cord of excessive strains, and thus secure a more uniform lacing, and consequently a more uniform spacing of the quarters of the upper when applied to the last.

To this end one feature of the invention contemplates the provision in a machine for lacing shoe uppers of means for successively forming a series of loops in a lacing cord and presenting them in position to be passed through the eyelet holes of a shoe upper. With this construction each loop is drawn independently of the others, the loop farthest from the cord supply being preferably drawn first, and the other loops being drawn in succession until the desired number of loops have been formed. The strain upon the cord may be only that incidental to drawing a single loop, and any desired number of loops may therefore be formed without subjecting the cord to undue strain, and without danger of unequal stretching of the cord during successive operations of the lacing mechanism. By first forming the loop which is farthest from the cord supply, the necessity for the employment of devices for drawing off slack thread previous to the formation of the loops and giving up this slack thread during the formation of the loops is avoided, and the construction thus simplified and rendered more rapid and accurate in operation. The specific construction and arrangement of the devices for successively forming the series of loops in the lacing cord are not material to this feature of the invention in its broader aspects. In the simplest and most efficient embodiment of the invention which I have yet devised, however, the loop forming devices comprise a series of needles similar to the looper needles shown and described in the application above referred to, and a series of coöperating looper fingers which are operated to engage the cord held in the eyes of the needles and to draw the same into the form of loops.

It is a further object of the invention to improve and simplify the construction and arrangement of the various parts of a lacing machine of the general type shown and described in the patent above referred to, so that it will operate to lace a shoe upper in a more satisfactory and reliable manner than the shoe upper lacing machines heretofore constructed.

To this end a further feature of the invention contemplates the provision in a machine provided with a series of looper needles of coöperating loopers, each of which is provided with cord engaging fingers arranged to engage the cord on opposite sides of the corresponding needles, and to maintain the sides of the loop carried by each needle in close and uniform relation to the sides of the needle, whatever the spacing of the needles and loopers. With this construction, each loop is held by a needle and the corresponding looper in proper position to be quickly and readily inserted in the eyelet holes of an upper, without requiring any effort on the part of the operator, or subjecting the cord to a strain tending to displace or injure it.

Further features of the invention contemplate the provision of improved devices for supporting and adjusting the looper needles and coöperating loopers; the provision of improved means for operating the looper fingers in discharging an upper from the needles so that the upper will first be disengaged from the needle farthest from the knotting mechanism and from the other needles successively; the provision of improved devices for adjusting the operating mechanism for the loopers to vary the length of the loops formed; the provision of improved means for adapting the machine to insert a lacing in different numbers of eyelets; and the provision of an improved knotting mechanism adapted to operate successfully upon hard and wiry cord, and to tie the knots in the lacing cord at a uniform distance from the shoe uppers.

The various features of the invention above referred to, as well as certain further features relating to the preferred form and arrangement of devices employed in embodying the broader features of the invention in a machine of the character shown and described in the patent above referred to, will be understood from an inspection of the accompanying drawings, and the following detailed description of the machine shown therein.

In the drawings Figure 1 is a front elevation of a lacing machine embodying the various features of the invention in their preferred forms; Fig. 2 is a plan view of the machine; Fig. 3 is an end elevation looking toward the left in Fig. 1, the parts at the right of the line 3—3 being removed; Fig. 4 is a detail side elevation showing the looper needles and looper fingers in the position which they occupy when presenting the loops in position to be passed through the eyelet holes of the upper; Fig. 5 is a sectional view on line 5—5, Fig. 1; Fig. 6 is a sectional view on line 6—6, Fig. 5; Fig. 7 is a detail plan view of the needles and coöperating loopers; Fig. 8 is a side elevation of the parts shown in Fig. 7, the cross bar for rocking the needles being shown in section; Fig. 9 is a detail plan view showing the upper applied to the needles and the shuttle needle carrying the lacing cord through the loops held by the looper needles; Fig. 10 is a side elevation of the parts shown in Fig. 9; Fig. 10$^a$ is a plan view similar to Figs. 7 and 9, showing the operation of the loopers in discharging the upper from the looper needles; Fig. 11 is a sectional view on line 11—11, Fig. 5; Fig. 12 is a detail front elevation partly in section showing the knotting mechanism and the grippers for holding the ends of the lacing cord: Figs. 13 to 16 inclusive are details showing the mode of operation of the knotting mechanism; and Fig. 17 is a vertical section on line 13—13, Fig. 12.

In the machine shown, the devices for forming a series of loops in the lacing cord, and presenting them in position to be passed through the eyelet holes of an upper, consist of a series of looper needles 1 and a series of coöperating loopers 2 which are mounted in a carrier 3. In the main views of the drawings the needles and loopers are shown in the position which they occupy just previous to the feeding of the lacing cord thereto. While the needles and loopers are in this position, the lacing cord is laid across the tops of the needles in position to be engaged by the open eyes of the needles by the shuttle needle 4, which advances across the tops of the needles and back of the loopers and gives the free end of the lacing cord to the cord gripper 5. The shuttle needle then returns to its initial position, laying the cord across the tops of the looper needles. The needle carrier 3 is then advanced and moved upward to bring the cord into the eyes of the needles. The loopers are then retracted to form the loops, and the needles are turned through a quarter revolution, the needle carrier moving downward into the position indicated in Fig. 4 to bring the needles into position where the operator may apply the upper thereto. The driving mechanism of the machine is so constructed that the machine stops with the parts in this position. After the operator has applied the upper to the needles, the machine is started, and the needle carrier is moved to bring the loops carried by the looper needles into position for the passage of the shuttle needle 4 therethrough. The shuttle needle then advances, carrying the lacing cord through the loops held by the looper needles, and presents the cord to the cord gripper 6. When the cord gripper 6 descends to grip the cord, the cord is severed from the cord supply, and the end of the lacing is held by the gripper. After the shuttle needle has returned, the loopers are advanced to push the upper off the looper needles. The knotting mechanism then operates to tie the ends of the lacing together, and the laced upper is discharged from the machine. After the upper is pushed off of the looper needles, the needles are returned to the position shown in the main views of the drawings, the cord is presented to the needles, and the loops are formed and presented in position to receive the upper as above described.

The needle carrier 3 is in the form of a frame or head provided with rearwardly extending arms 7 which are supported upon the main shaft 8 of the machine. The rear ends of the arms are provided with yokes adapted to slide upon rectangular blocks which are in turn mounted upon the shaft 8 (Figs. 2, 3 and 5). Forward and return movements are imparted to the carrier through a cam formed in a cam disk 9 and engaged by a roll 10 mounted on one of the arms 7. The needle carrier is raised and lowered and rigidly supported when in its raised position by a lever 11 provided with arms 12 which are connected by links 13 with the arms 7 of the needle carrier (Figs. 1 and 3). The arms 12 of the lever 11 and links 13 form toggles which rigidly support the needle carrier when in its raised position. The lever 11 is rocked at proper intervals to raise and lower the needle carrier through a link 14, one end of which is connected with an arm 15 of the lever 11, and the other end of which is connected to a cam lever 16. The cam lever carries a roll 17 engaging a cam groove formed in a cam disk 18 which is secured to the main shaft 8 of the machine (Figs. 2 and 4).

The needles 1 are secured in rocking spindles 19 which are mounted in a series of carrier blocks 20. These carrier blocks are mounted in a transverse horizontal guideway formed in the needle carrier, and may be adjusted in this guideway to vary the spacing of the needles to correspond to the spacing of the eyelets to be laced. In order that the needles may be conveniently adjusted for different spacing of eyelets, and may be maintained at equal distances apart, whatever their adjustment, the carrier blocks 20 are connected by a series of links 21 which are pivoted intermediate their ends to form a lazy tong. A rack 22 is secured to one of the links, and this rack is engaged by a pinion 23 carried by the inner end of a shaft 24. The outer end of the shaft 24 projects through the front plate 25 of the needle carrier, and is provided with a knurled head 26 by which the adjustment of the looper needles for differently spaced eyelets may be quickly and conveniently made. A scale 27 may be provided for indicating the proper adjustment for the different sizes or styles of shoes. When the spacing of the needles 1 is varied, the spacing of the loopers 2 should also be varied to correspond to the spacing of the needles. This is provided for in an improved and simplified manner by mounting the loopers upon the blocks 20 which carry the needles. In the construction shown, the looper fingers 2 are formed on the front ends of bars 28 which are mounted to slide in bearings 29 formed on the blocks 20. The rear ends of the bars 28 are connected to blocks 29' which are mounted to slide on guideways 30 on the carrier blocks 20, and are connected through links 31 with the looper actuating mechanism. With this construction the simultaneous adjustment of the loopers and looper needles may be quickly and conveniently effected, and the parts are so mounted and arranged that there is practically no tendency for the carrier blocks 20 to bind in the guideway and resist adjustment.

In order that the sides of the loops drawn by the loopers may lie close to the sides of the looper needles, where they will offer no substantial resistance to the application of the upper to the needles, each looper is provided with cord engaging fingers 32 which straddle the corresponding needle and engage the cord and retain it close to the opposite side of the needle.

The mechanism for actuating the loopers is so constructed and operated that the loopers are retracted successively, the looper which is farthest from the cord supply being retracted to substantially complete the forming of the first loop before the next adjacent looper is retracted to engage the cord, and each looper being thus successively actuated to draw its loop as soon as the preceding loop has been substantially completed. The cord for each loop is thus drawn directly from the cord supply, and the reeving of the cord through the eyes of the needles and about the looper fingers, and the strain put upon the cord, is reduced to a minimum. Comparatively weak and cheap grades of cord may therefore be used without danger of breaking the cord in the formation of the loops. The successive formation of the loops also enables the sides of the loops to be maintained close to the sides of the needles, whatever the spacing of the looper needles without putting undue strain upon the cord, even in forming a comparatively large number of loops. The formation of the loops in succession also enables any desired number of loops to be formed without putting a severe strain upon the cord. In the construction shown, each of the loopers is actuated independently of the others through a cam 33 and independent connections. The series of cams 33 for independently operating the loopers are secured upon a shaft 34 mounted in the arms 7 of a needle carrier, and driven from the main cam shaft 8 through gearing 35. The devices for connecting each cam 33 with the corresponding looper consists of a lever 36, one end of which carries a roll engaging the groove in the cam, and the other end of which is connected to the lower end of a rock arm 37. The rock arm is pivoted at 38 to the inner end of a link 39, the outer end of which is pivoted on a rod 40, which may be adjusted in a manner and for a purpose to be described later. The upper end of the rock arm 37 carries a pin 41 which engages a recess or bearing in the front end of a link 42, the rear end of which is pivoted to a lever 43. The lever 43 is mounted on a rod 44, and carries an arm 45 which is pivoted on the lever, so that it may swing laterally to accommodate the lateral adjustment of the blocks 20 which carry the loopers and needles. The upper end of the arm 45 is connected by a ball and socket joint with the rear end of the link 31, the front end of which is pivoted to the block 29 as above described. Through these connections the loopers are independently actuated, and the cam grooves in the cams 33 are so shaped that the loopers are retracted in succession. The cam grooves are also preferably so shaped that the loopers will complete their forward movements successively and in such manner that the eyelets will be disengaged from the looper needles in succession, the eyelets farthest from the knotting mechanism being the first to be disengaged from the looper needles. This manner of disengaging the upper from the looper needles insures the proper discharge of the upper from the needles, and avoids hanging the upper upon the needles, as sometimes occurs when the eyelets are disengaged simultaneously from all the needles.

The looper needles should remain in position to retain the lacing cord in their eyes until the last loop has been formed, and should then be turned through 90° to bring the loops into position for receiving the shuttle needle after the upper has been applied to the needles, as indicated in Fig. 9. In order that the needles may be thus turned, the spindles 19 in which they are secured are provided on their rear ends with crank arms 46 carrying pins 47 which engage a groove in an actuating bar 48. The bar is operated to rock the needles at the proper time by devices connecting the bar with the cam which actuates the looper nearest the cord supply. As shown, these connecting devices consist of a link 49, the rear end of which is pivoted to the left-hand cam lever 36, and the front end of which is connected to the rear end of a lever 50, the front end of which is connected to one end of the bar by a link 51. The lever 50 is secured to one end of a rock shaft 51', the other end of which carries an arm 50' connected by a second link 51 to the opposite end of the bar 48 (Figs. 5, 7, 8 and 10.)

The length of the loops drawn by the loopers is varied by adjusting the connections between the actuating cams and loopers to vary the movement imparted to the loopers by the cams. It is desirable that the advance movement of the loopers in discharging the upper from the looper needles should be uniform, and that the variation in the length of loops should be secured by varying the extent to which the loopers are retracted. The means for adjusting the connections between the actuating cams and loopers is accordingly constructed to secure this result. In the construction shown, the variation in the lengths of loops drawn by the loopers is secured by adjustment of the rod 40 on which the links 39 are pivoted. In order that the loopers may be advanced to the same point, whatever the length of loop being drawn, the rod 40 is so mounted that it is adjusted about an axis which is coincident with the axes of the pivots 38 of the rock arms 37 when the loopers are in advance positions. As shown, the rod 40 is carried in a yoke 52, the arms of which are pivotally mounted upon the pivot bolts 38' by which the upper ends of the links 13 are secured to the needle carrier 3 (Figs 1 and 3.) These pivot bolts are so arranged that they are in line with the pivots 38 when the loopers are in their advanced position. In order that the desired adjustment of the rod 40 may be quickly and conveniently made, the yoke 52 is provided with a segment 53 which is engaged by a pinion 54 secured to the inner end of a shaft 55 (Fig. 3). The shaft 55 extends out through the front plate of the needle carrier, and is provided with a knurled head 56 by which it may be conveniently operated. A scale 57 may be provided back of the knurled head for indicating the adjustments corresponding to the different sizes or styles of shoes.

With the construction of loop forming devices shown and described in the patent above referred to, it is necessary to remove one or more of the looper fingers in case it is desired to use the machine for inserting lacings in a number of eyelets less than the number of looper needles with which the machine is provided. These looper fingers must be replaced and readjusted when it is again desired to insert the lacing in an increased number of eyelets. This removal and readjustment of the looper fingers requires considerable time, and frequently necessitates considerable experimenting before the looper fingers are properly adjusted to cast off the upper properly. These disadvantages incident to the prior construction are eliminated in the present machine by providing means for disconnecting any desired number of the loopers from the looper actuating mechanism when it is desired to decrease the number of loops formed, and for reconnecting the loopers with the actuating mechanism when the number of loops is to be increased. In the specific construction shown, the loopers are disconnected from the actuating cams 33 by disengaging the links 42 from the pins 41. When any one of the links 42 is disengaged from the corresponding pin 41, the looper corresponding to the link 42 remains in its retracted position, and is therefore out of action. When the link 42 is reëngaged with the pin 41, the looper is again thrown into action without requiring any readjustment or resetting on the part of the operator.

In order that any desired number of loopers may be readily thrown into and out of action, means are provided for disengaging any desired number of the links 42 from the corresponding pins 41, and retaining them in inactive position. In the form shown, this means comprises a sleeve 58 mounted to turn upon a stud 59, and provided with a series of lugs 60 of progressively increasing length. The sleeve 58 underlies the links 42, and the lugs are arranged to engage and lift the links 42 into inactive position. The sleeve 58 is provided with a spiral pinion 61 which is engaged by a pinion 62 secured to an actuating shaft 63. The shaft 63 projects through the front plate of the needle carrier, and is provided with a knurled head 64 by which the operator may conveniently adjust the sleeve 58 to vary the number of loopers in action. A scale 65 may be provided back of the head 64 to indicate the number of loopers which are in action for any adjustment of the head. The shortest lug 60 is arranged to act upon the link 42 corresponding to the left-hand looper, the next lug is arranged to act upon the links corresponding to the two left-hand loopers, and so on (Fig. 6). Thus by properly adjusting the sleeve 58, any desired number of the loopers may be readily thrown out of action, or any of the loopers which have previously been thrown out of action may be reconnected to the actuating mechanism in correct relation to properly coöperate with the looper needles.

When the looper needles with the upper applied thereto are moved up to present the loops carried by the needles in position for the passage of the shuttle needle, the upper is forced back and properly positioned upon the needles by a work adjuster. This work adjuster comprises a plate 66 carried upon the outer ends of two arms 67 which are secured to the arms of a yoke 68. The rear end of the yoke 68 is pivotally supported upon the upper end of a lever 69, the lower end of which carries a roll engaging a cam groove formed in the cam disk 9. The work adjuster is moved forward and back at proper intervals by the cam groove in the disk 9, and is raised and lowered as it is moved forward and back by stationary cam slides 70 which are engaged by rolls 71 mounted on the arms 67. When the work adjuster is moved rearwardly or in a direction to engage and position the upper, the rolls 71 ride down the cam grooves 70 so that the plate 66 is brought into position to pass below the looper needles 1. The plate is so arranged that in passing below the needles it will engage and bring into proper alinement any needle which may have been bent down out of proper position. The work adjuster is also provided with a second plate 72 arranged to pass over the needles 1, and to bring any needle which may have been bent up out of position into proper alinement. The plate 66 therefore not only acts as a work adjuster, but also acts in conjunction with the plate 72 to properly aline the looper needles and hold them in position for the passage of the shuttle needle through the loops on the looper needles.

The shuttle needle 4 is secured in an arm 73 which projects downward from a slide 74. The slide 74 is mounted to reciprocate in a guideway 75, and is provided on its rear side with a rack 76 which is engaged by a gear 77. A second gear 78 is secured to the gear 77, and is engaged by a segment 79 formed on the front end of a lever 80, the rear end of which carries a roll 81 engaging a cam groove in the drum 82. Through this mechanism the shuttle needle is reciprocated at proper times to deliver the lacing cord to the looper needles, and to pass the cord through the loops to form a locking cord. The lacing cord passes from the supply through a tension device 83, and thence through the shuttle needle.

The cord grippers 5 and 6, which act to hold the ends of the lacing cord, consist of forwardly projecting fingers formed on the lower ends of gripper bars 84 and 85 which are mounted to reciprocate in a fixed bracket 86. These gripper bars are actuated at proper intervals through bell crank levers 87, the upper ends of which are arranged to engage recesses in the upper ends of the gripper bars, and the lower ends of which are pivotally connected to sleeves 88. Each sleeve 88 loosely surrounds the forward end of a link 89, and each lever 87 is connected with the corresponding link 89 by a spring 90. The rear ends of the links 89 are pivotally connected to the upper ends of two bell crank levers 91, the lower ends of which carry rolls engaging grooves formed in the opposite sides of a disk 92 which is secured to the cam shaft 8. Through these connections the gripper bars are actuated at proper intervals to grip and release the lacing cord, the springs 90 yielding so that the cord is engaged by a yielding grip so that the grippers accommodate themselves to any variation in the size of the cord.

After the shuttle needle has advanced to carry the lacing cord through the loops held by the looper needles and loopers, and has presented the cord in position to be gripped by the gripping finger 6, the gripping finger is pressed to engage the cord, and then after the shuttle needle has been retracted somewhat, the gripping finger is further depressed to sever the cord against a cutter blade 93 arranged at the side of the gripper finger. After the shuttle needle has completed its return movement, and the upper has been discharged from the looper needles, the ends of the lacing cord are secured together by the action of a knotting mechanism which is arranged between the cord grippers 5 and 6 and the looper needles. In the construction shown the knotting mechanism comprises a looping post 94 about which the cord is carried to form a loop, a rotary gripper 95 for carrying the ends of the lacing cord about the looping post, and a hook 96 arranged to reciprocate within the looping post and draw the ends of the cord through the loop formed on the looping post. The looping post 94 is formed on the lower end of a sleeve 97, the upper end of which is secured in a fixed bearing 98. The cord carrying gripper 95 is carried on the lower end of a sleeve 99 which surrounds the sleeve 97 and is mounted to turn and reciprocate in a fixed bearing 100. A pinion 101 is formed on the sleeve 99 above the bearing 100, and is engaged by a gear 102 through which intermittent rotary movement is imparted to the sleeve. The upper end of the sleeve 99 is provided with an annular groove above the pinion 101, and is connected with the arms of a yoke 103 by pivot screws 104 passing through the yoke arm and engaging a ring 105 loosely mounted in the annular groove. The yoke 103 is formed on the front end of a lever 106, the rear end of which carries a roll 107 engaging a cam groove formed in the disk 92. Through these connections the gripper carrying sleeve 99 is moved longitudinally of the looping post in the manner to be described. The cord drawing hook 96 is formed on the lower end of a rod 108 which extends up through the sleeve 97 and is connected at its upper end with the arms of a yoke 109 by means of pivot screws 110 passing through the ends of the yoke and engaging a ring 111 which is mounted in a collar 112 secured to the end of the rod. The yoke 109 is formed on the front end of a lever 113, the rear end of which carries a roll engaging a cam groove in the disk 92, by which proper reciprocating movements are imparted to the cord drawing hook.

The cord carrying gripper 95 is provided with a fixed jaw in the form of a finger 114 extending downward from the lower end of the sleeve 99, and arranged substantially parallel to the looping post 94. The gripper is also provided with a movable jaw in the form of a finger 115 pivotally mounted on the finger 114, and forced toward the finger 114 by a spring 116. The lower end of the finger 115 is provided with a lateral extension 117 which projects through a recess in the finger 114 and is arranged to underlie the lacing cord and retain it between the grippers during the winding of the cord about the looping post. The gripping finger 115 is also provided with a projection 118 adapted to overlie the cord, and retaining it in place between the gripping jaws. The upper end of the gripping finger 115 is also provided with a projecting arm 119 which is arranged to be engaged by the lower end of a screw 120.

During the operation of the shuttle needle, looper fingers and loopers in forming and introducing the lacing, the knotting mechanism is in the position indicated in the main views of the drawings and in Figs. 12 and 17. When the parts are in this position, the gripping finger 115 is held away from the gripping finger 114 by the engagement of the arm 119 with the pin 120, so that the jaws of the thread carrying gripper lie on opposite sides of the path of the shuttle needle. The ends of the lacing cord are therefore carried between the jaws of the thread carrying gripper and above the retaining projection 117 by the shuttle needle, and when the upper is discharged from the looper needles the ends of the lacing cord lead from the cord holding grippers 5 and 6 over the retainer 117 and thence to the upper which is suspended from the cord carrying grippers of the knotting mechanism, as indicated in Fig. 12. At this time the lacing cord passes between a clamping jaw 121 and a guard bar 122. The clamping jaw 121 is formed on the lower end of an arm 122', the upper end of which is pivoted to the fixed bearing 98. Just before the knotting mechanism operates to form a knot in the ends of the lacing cord, the gripper 121 is operated by means which will be hereinafter described to clamp the lacing between the knotting mechanism and the upper. The cord for forming the knot will therefore be drawn from the cord beyond the knotting mechanism, and consequently the knot will be tied at a uniform distance from the upper, without regard to the amount of cord which enters into the knot.

After the upper has been discharged from the looper needles, the knot carrying grippers start to rotate about the looping post. The arm 119 is immediately disengaged from the end of the screw 120, so that the jaws of the gripper are closed upon the lacing cord. At the same time the cord holding grippers 5 and 6 are raised to release the lacing cord, as indicated in Fig. 13. During the first rotation of the cord carrying grippers about the looping post the cord is retained on the looping post by a cord retaining latch 123 arranged to engage the lower end of the looping post and prevent the cord from slipping off the lower end of the post. This retainer is formed at the lower end of a lever 124 which is pivoted at 125, and is provided with cam surfaces 126 and 127 adapted to be engaged by corresponding cam surfaces on an actuating bar 128. The bar 128 is connected at its upper end with one of the pivot screws 110 on the end of the yoke 109. After the cord carrying gripper has made about one and one-quarter revolutions, as indicated in Fig. 14, and has thus formed a loop about the looping post, the gripper carrying sleeve 99 is moved downward so that during the next half revolution of the cord carrying gripper the lacing cord is carried below the end of the looping post and laid into the cord drawing hook 96, as shown in Fig. 15. The rod 108 is then raised to draw the cord drawing hook up into the end of the looping post, and during this movement of the cord drawing hook the actuating bar 128 engages the cam 126 on the retaining latch, and withdraws the latch 123 so that the loop of the knot may be cast off the end of the looping post, as indicated in Fig. 16. As the cord carrying grippers complete the second revolution, the sleeve 99 is raised, and the arm 119 is brought into engagement with the screw 120, thus opening the gripper jaws to release the ends of the lacing, and to bring the cord carrying grippers into initial position. During the formation of the knot the ends of the lacing cord are held by the cord carrying gripper, and the cord entering into the knot is drawn through the jaws, and the cord is thus held under tension. After the knot is completed and tightened by the upward pull of the cord drawing hook, the hook is returned to its initial position, thus releasing the cord, and the clamp 121 is disengaged from the lacing so that the laced upper drops away from the knotting mechanism.

The mechanism through which rotary movements are imparted to the cord carrying grippers of the knotter is as follows: The gear 102 heretofore referred to is secured upon a short vertical shaft 129 upon which is secured a spiral gear 130. This gear engages a similar spiral gear 131, which is secured to the front end of a shaft 132. The rear end of the shaft 132 carries a spiral gear 133 which is adapted to be engaged by a series of spiral gear teeth 134 formed on the periphery of the disk 92. The gear 133 is also provided with a radially extending groove adapted to be engaged by an annular locking rib 135 also formed on the periphery of the disk 92. The spiral teeth 134 are so arranged that they will impart a single revolution to the gear 133. The gear 102 is twice the diameter of the pinion 101 on the gripper carrying sleeve, and therefore the cord carrying gripper is rotated through two complete revolutions each time the gear 133 is given a single revolution.

The gripper arm 122' is operated at the proper intervals by a cam 136 carried on the under side of the gear 102, and engaged by a roll carried on the inner end of a link 137, the outer end of which is pivotally connected at 138 with the gripper arm.

It will be understood that the various features of the invention are not confined in their application to machines in which the loopers and looper needles or other loop forming devices are actuated to form the loops successively, but may be embodied with advantage in machines in which the loops are formed simultaneously, as in the machine of the patent referred to. It will also be understood that the specific construction and arrangement of parts shown and described are not essential to the invention in its broader aspects, and may be varied and modified without departing therefrom.

Having explained the nature and object of the invention, and specifically described one form of machine in which it may be embodied, what I claim is:—

1. A machine for lacing shoe uppers, having, in combination, devices for simultaneously passing a series of loops of lacing cord through the eyelet holes of a shoe upper, and mechanism for successively forming the loops, substantially as described.

2. A machine for lacing shoe uppers, having, in combination, devices for simultaneously passing a series of loops of lacing cord through the eyelet holes of a shoe upper, mechanism for successively forming the loops, and means for securing the lacing, substantially as described.

3. A machine for lacing shoe uppers, having, in combination, devices for presenting a series of loops of lacing cord in position to be passed through the eyelet holes of a shoe upper, mechanism for successively forming the loops, and means for passing a locking cord through the loops, substantially as described.

4. A machine for lacing shoe uppers, having, in combination, devices for presenting a series of loops of lacing cord in position to be passed through the eyelet holes of a shoe upper, mechanism for successively forming the loops, means for passing a locking cord through the loops, and means for securing together the ends of the cord, substantially as described.

5. A machine for lacing shoe uppers, having, in combination, a series of looper needles arranged to pass a series of loops of lacing cord through the eyelet holes of a shoe upper, means coöperating therewith to successively form a series of loops in the lacing cord, means for passing a locking cord through the loops, and means for securing the lacing, substantially as described.

6. A machine for lacing shoe uppers, having, in combination, a series of needles arranged to pass a series of loops of lacing cord through the eyelet holes of a shoe upper, and means coöperating with the needles to successively form loops in the lacing cord, substantially as described.

7. A machine for lacing shoe uppers, having, in combination, a series of needles arranged to pass a series of loops through the eyelet holes of a shoe upper, a series of loopers coöperating therewith to form a series of loops, and means for relatively actuating the loopers and needles to form the loops successively, substantially as described.

8. A machine for lacing shoe uppers, having, in combination, a series of needles, a series of loopers coöperating therewith to form a series of loops, and means for successively actuating the loopers, substantially as described.

9. A machine for lacing shoe uppers, having, in combination, a series of needles arranged to pass a series of loops of lacing cord through the eyelet holes of an upper, and a coöperating series of loopers, each provided with cord engaging fingers on opposite sides of the corresponding needle, substantially as described.

10. A machine for lacing shoe uppers, having, in combination, a series of laterally adjustable looper needles, a series of loopers adjustable therewith and each provided with cord engaging fingers on opposite sides of the corresponding needle, substantially as described.

11. A machine for lacing shoe uppers, having, in combination, a series of looper needles, a coöperating series of loopers, each provided with cord engaging fingers on opposite sides of the corresponding needle, and mechanism for actuating the loopers successively, substantially as described.

12. A machine for lacing shoe uppers, having, in combination, a series of laterally adjustable needle carriers, a needle and a coöperating looper mounted upon each carrier, substantially as described.

13. A machine for lacing shoe uppers, having, in combination, a series of laterally adjustable needle carriers, a needle mounted in each carrier, and a coöperating looper mounted to reciprocate on each carrier, substantially as described.

14. A machine for lacing shoe uppers, having, in combination, a series of laterally adjustable carrier blocks, a looper needle mounted in each block, a looper mounted to reciprocate on each block, and means for adjusting the blocks to space the needles in accordance with the spacing of the eyelet holes in the upper to be laced, substantially as described.

15. A machine for lacing shoe uppers, having, in combination, a needle carrier, a series of laterally adjustable needle carrying blocks mounted therein, devices for adjusting the blocks to space the needles in accordance with the spacing of the eyelet holes of the upper to be laced including a rack connected with the blocks, a pinion engaging the rack, and an actuating device at the front of the needle carrier for operating the pinion, substantially as described.

16. A machine for lacing shoe uppers, having, in combination, a series of needles arranged to pass a series of loops of lacing cord through the eyelet holes of an upper, a series of loopers, and mechanism for actuating the loopers to discharge the eyelet successively from the needles, substantially as described.

17. A machine for lacing shoe uppers, having, in combination, a series of needles arranged to pass loops of lacing cord through the eyelet holes of a shoe upper, a series of coöperating loopers, and actuating mechanism connected to actuate the loopers independently, substantially as described.

18. A machine for lacing shoe uppers, having, in combination, a series of needles arranged to pass loops of lacing cord through the eyelet holes of a shoe upper, a series of coöperating loopers, and means for rendering certain of the loopers active or inactive to vary the number of loops formed, substantially as described.

19. A machine for lacing shoe uppers, having, in combination, a series of needles arranged to pass loops of lacing cord through the eyelet holes of a shoe upper, a series of coöperating loopers, actuating mechanism for the loopers including means for disconnecting and connecting the loopers to vary the number of loops formed, substantially as described.

20. A machine for lacing shoe uppers, having, in combination, a series of needles arranged to pass loops of lacing cord through the eyelet holes of a shoe upper, a series of coöperating loopers, and actuating mechanism for the loopers including a series of cams and connections for independently operating the loopers, substantially as described.

21. A machine for lacing shoe uppers, having, in combination, a series of needles arranged to pass loops of lacing cord through the eyelet holes of an upper, a series of coöperating loopers, actuating mechanism, a series of links connecting the loopers and actuating mechanism, and means for engaging the links with and disengaging them from the actuating mechanism to vary the number of loops formed, substantially as described.

22. A machine for lacing shoe uppers, having, in combination, a series of needles arranged to pass loops of lacing cord through the eyelet holes of an upper, a series of coöperating loopers, actuating mechanism, a series of links connecting the loopers and actuating mechanism, an adjustable sleeve provided with lugs of different lengths for disengaging varying numbers of links from the actuating mechanism, and a device accessible to the operator for adjusting the sleeve, substantially as described.

23. A machine for lacing shoe uppers, having, in combination, a series of needles arranged to pass loops of lacing cord through the eyelet holes of an upper, a series of coöperating loopers, actuating mechanism, and detachable connections adjustable to vary the loop drawing stroke of the loopers, substantially as described.

24. A machine for lacing shoe uppers, having, in combination, a series of needles arranged to pass loops of lacing cord through the eyelet holes of an upper, a series of coöperating loopers, actuating mechanism for the loopers including rock arms, links on which the arms are pivoted, and a support for the links adjustable to vary the movement of the rock arms, substantially as described.

25. A machine for lacing shoe uppers, having, in combination, a series of needles arranged to pass loops of lacing cord through the eyelet holes of an upper, a series of coöperating loopers, actuating mechanism for the loopers including rock arms, links on which the arms are pivoted, and a support for the links adjustable about an axis in line with the pivots of the arms when the loopers are at the end of their forward stroke, substantially as described.

26. A machine for lacing shoe uppers, having, in combination, a needle arranged to pass a loop of lacing cord through eyelet holes of an upper, a looper coöperating therewith to form a loop, actuating mechanism for the looper including a rock arm, a link on which the arm is pivoted, and a support for the link adjustable to vary the movement of the rock arm, substantially as described.

27. A machine for lacing shoe uppers, having, in combination, a needle arranged to pass a loop of lacing cord through eyelet holes of an upper, a looper coöperating therewith to form a loop, actuating mechanism for the looper including a rock arm, a link on which the arm is pivoted, and a support for the links adjustable about an axis in line with the pivot arm when the looper is at the end of its forward stroke, substantially as described.

28. A machine for lacing shoe uppers, having, in combination, means for inserting a lacing cord in the eyelet holes of a shoe upper, cord grippers arranged to grasp the ends of the lacing, and knot tying mechanism comprising a looping post, a cord drawing hook mounted to reciprocate within the post, a cord carrying gripper, and mechanism for operating the gripper to carry the cord about the post and lay it in the cord drawing hook, substantially as described.

29. A machine for lacing shoe uppers, having, in combination, means for inserting a lacing cord in the eyelet holes of an upper, a knot tying mechanism for acting on the lacing comprising a looping post, a reciprocating cord drawing hook within the post, a latch for retaining the cord on the post, a cord carrying gripper, and mechanism for operating the gripper to carry the cord about the post and lay it in the cord drawing hook, substantially as described.

30. A machine for lacing shoe uppers, having, in combination, mechanism for inserting a lacing in the eyelet holes of a shoe upper including a cord carrying needle, cord grippers to which the ends of the lacing are delivered by the needle, a looping post, a cord carrying gripper provided with jaws between which the needle passes, mechanism for actuating the cord carrying gripper to carry the cord about the post, and devices coöperating therewith to complete the knot, substantially as described.

31. A machine for lacing shoe uppers, having, in combination, a series of needles arranged to pass loops of lacing cord through the eyelet holes of an upper, loopers coöperating therewith to form a series of loops in the lacing cord, a shuttle needle for delivering cord to the series of needles and passing a locking cord through the loops held by the needles, cord grippers to which the ends of the lacing are delivered by the needle, and knotting mechanism comprising a looping post, a cord drawing hook mounted to reciprocate in the post, a cord carrying gripper to which the lacing is delivered by the shuttle needle, mechanism for operating the gripper to carry the cord about the post and lay it in the cord drawing hook, a latch for retaining the cord on the post, and mechanism for actuating the latch to release the cord, substantially as described.

32. A machine for lacing shoe uppers, having, in combination, means for inserting a lacing cord in the eyelet holes of an upper, a knotting mechanism for tying the ends of the lacing together, a device for clamping the lacing between the knotting mechanism and upper, mechanism for actuating the knotting mechanism to tie the knot in the lacing, and mechanism for operating the clamping device previous to the forming of the knot whereby the cord for the knot is drawn from the free ends of the lacing, substantially as described.

33. A machine for lacing shoe uppers, having, in combination, means for inserting a lacing cord in the eyelet holes of an upper, cord grippers arranged to grasp the ends of the lacing, a knot tying mechanism arranged to act on the lacing between the cord grippers and shoe upper comprising a latching post, a cord carrying gripper, mechanism for operating the gripper to carry the cord about the post to form a loop, mechanism for operating the cord grippers to release the ends of the lacing previous to the formation of the loop, and means for drawing the lacing through the loop formed on the post, substantially as described.

34. A machine for lacing shoe uppers, having, in combination, means for inserting a lacing cord in the eyelet holes of an upper, a knotting mechanism comprising a looping post, a cord drawing hook mounted to reciprocate in the post, a cord carrying gripper, and mechanism for operating the gripper to carry the cord about the post and lay it in the cord drawing hook, substantially as described.

WILLARD A. SMITH.

Witnesses:
N. D. McPhail,
Warren G. Ogden.